United States Patent [19]
Tibbals, Jr.

[11] 3,870,190
[45] Mar. 11, 1975

[54] CONTAINER
[76] Inventor: Edward Camp Tibbals, Jr., 2680 Young Field St., Boulder, Colo. 80215
[22] Filed: Feb. 12, 1973
[21] Appl. No.: 331,507

[52] U.S. Cl. .................... 220/338, 220/334 G
[51] Int. Cl. ........................................ B65d 43/16
[58] Field of Search......... 220/24 R, 24 A, 30, 30.5, 220/31, 32, 33, 34, 38, 41, 55 R

[56] References Cited
UNITED STATES PATENTS

| 991,270 | 5/1911 | Bunn | 220/32 |
|---|---|---|---|
| 1,036,777 | 8/1912 | Austin | 220/32 |
| 1,216,330 | 2/1917 | Kroseng | 220/34 |
| 1,408,387 | 2/1922 | Nichols | 220/32 |
| 1,431,288 | 10/1922 | Corder | 220/34 |
| 2,628,739 | 2/1953 | Vischer | 220/24 R |
| 2,715,977 | 8/1955 | Allman | 220/32 |
| 3,392,870 | 7/1968 | Schulz | 220/32 |
| 3,438,536 | 4/1969 | Tarchalski | 220/60 R |
| 3,629,901 | 12/1971 | Wolf | 220/31 S |
| 3,658,096 | 4/1972 | Higuera | 220/55 K |

FOREIGN PATENTS OR APPLICATIONS
1,324,963  3/1962  France ............... 220/60 R Primary Examiner—William I. Price
Assistant Examiner—Ro E. Hart
Attorney, Agent, or Firm—Nims, Howes, Collison & Isner

[57] ABSTRACT

A container is provided which includes a vessel such as a glass having an opening therein. A lid is supported within the vessel across this opening and the entire periphery of the lid may be engaged with the interior surface of the vessel to close the container. The lid cannot be dislocated from its position extending across the opening of the vessel when the container is closed. To open the container a portion of the lid periphery is disengaged from the interior surface of the container. Dislocation of the lid from its position extending across the opening of the vessel is also prevented when the container is so opened.

10 Claims, 6 Drawing Figures

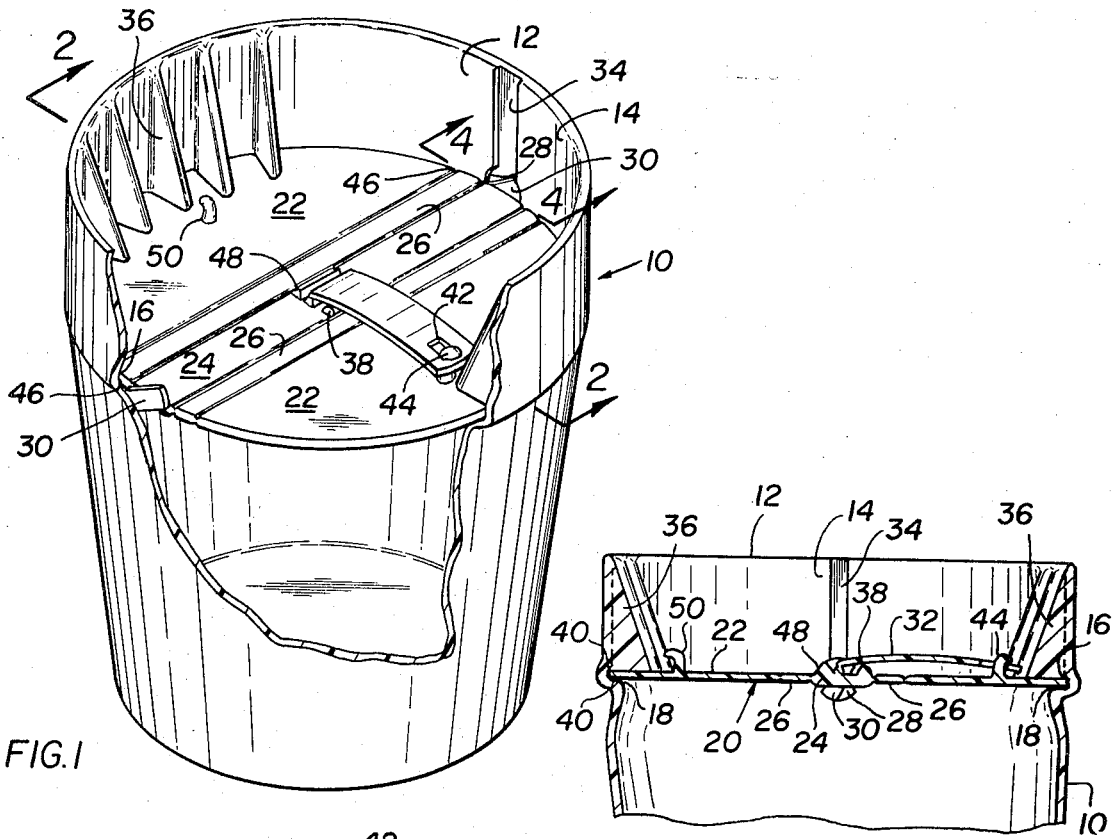
FIG.1
FIG.2
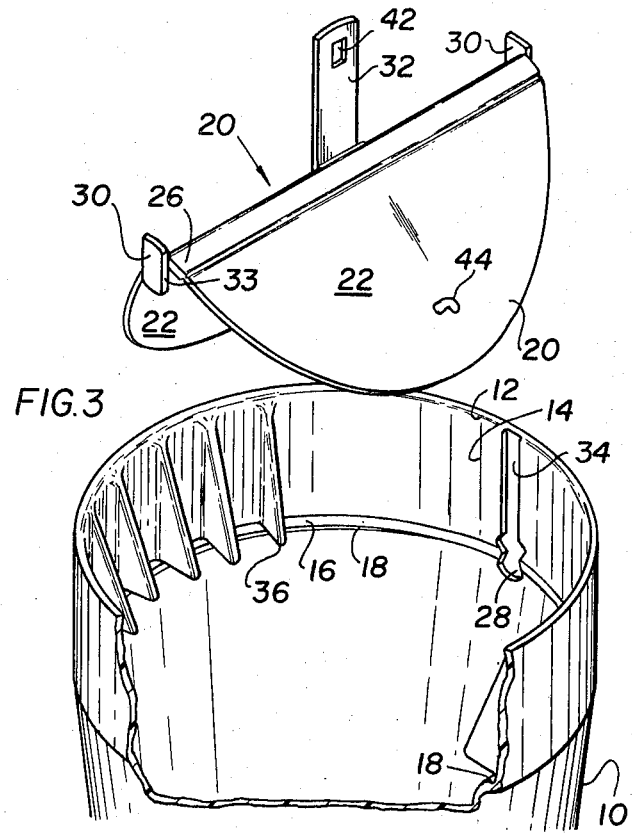
FIG.3
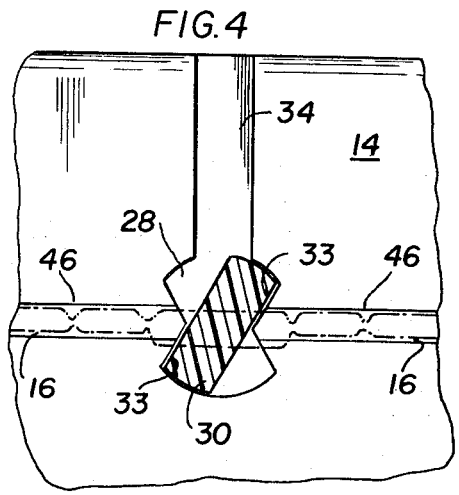
FIG.4

PATENTED MAR 11 1975

CONTAINER

The present invention relates to closeable containers and more particularly to a container closure member which allows the contents of a container to be poured therefrom without removing the closure member.

It is often desirable to pour the contents from a container without removing the lid. For example in fruit juice pitchers or cocktail shakers a restricted opening in the lid allows a controlled removal of the juice or cocktail.

When there is a substantial risk that the contents of the container will be spilled while being poured, such as with cups or glasses used in airplanes and cars a lid which remains in place while the contents is poured through a restricted opening minimizes this risk.

By being able to leave the lid in place across the opening of a cup while drinking a hot drink therefrom, the period over which the drink will remain hot will be greatly extended since heat escape will be reduced and evaporation minimized.

In many situations the contents of a container should be rigorously shook prior to and the container closed after each pouring. This is especially important with paints. Repeatedly removing the top or lid with paint suspended therefrom and replacing it securely to the paint can after each pouring is tedious, time consuming and messy and accordingly is impractical. By leaving the top in place and pouring the paint through a restricted opening the paint container can be easily closed after and shook throughly prior to each pouring.

This invention may be briefly described as a wide mouthed vessel that has a lid which can be urged into a sealing engagement with the vessel at the opening thereof to effectively close the container and which can be disengaged from a portion of the vessel to provide a restricted opening through which the contents of the container can be poured. While the container is either fully opened or closed the lid cannot be dislocated from its location extending across the opening of the vessel.

Among the advantages of the subject invention is the provision of a container which minimizes losses of the container contents through spillage or evaporation.

Accordingly the principle object of the present invention is the provision of a closeable vessel, the contents of which can be efficiently sealed therein and, when desired, poured therefrom while the lid or closure member is maintained across the vessel opening.

Other objects and advantages of the subject invention will become apparent from the following portion of this specification and from the accompanying drawings which illustrate, in accord with the mandate of the patent statutes, a presently preferred embodiment incorporating the principles of the invention.

Referring to the drawings:

FIG. 1 is a perspective view of the container of this invention with the vessel partially broken away.

FIG. 2 is sectional view of the container as constituted at the line 2—2 of FIG. 1.

FIG. 3 is a view similar to that of FIG. 1 of a portion of the container with the closure member removed from the vessel.

FIG. 4 is a sectional view of the container as constituted at the line 4—4 of FIG. 1.

Figure 5:
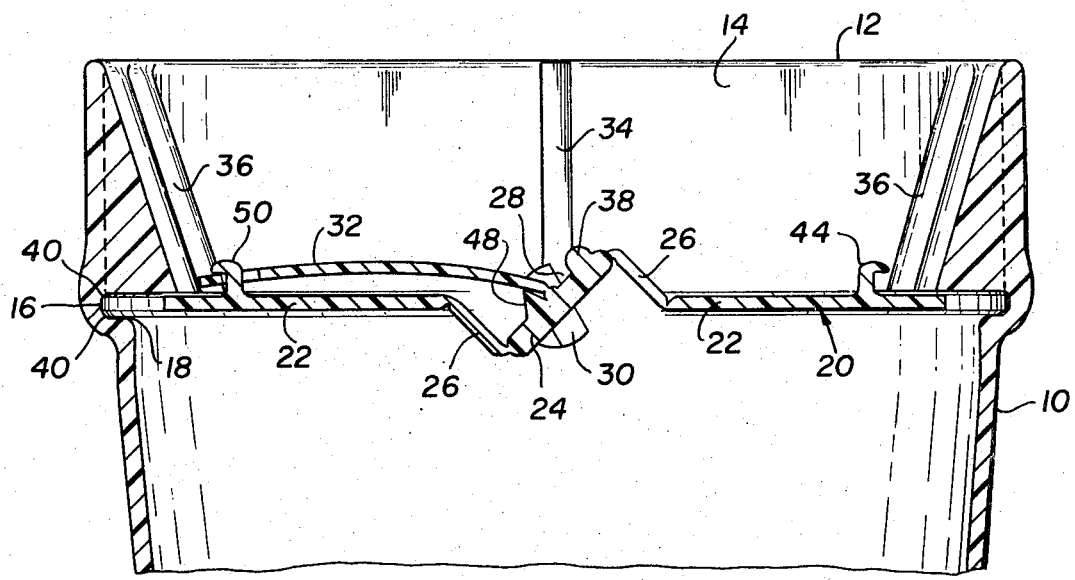
FIG. 5 is a view similar to that of FIG. 2 of a portion of the container with the closure lid in open position.

Referring to the drawings and particularly to FIGS. 1 and 2, there is provided a glass, jar, can or other vessel 10 which has a substantially cylindrical mouth or opening 12. The interior surface of the rim 14 of the vessel extends downwardly to an annular channel 16. A shoulder 18 projects into the vessel from the downward-most part of this channel and provides a shelf-like support upon which a closure member or lid 20 may be placed. The lid includes two semicircular end portions 22 and a central rectangular panel 24 which are joined together by a pair of elongated toggle hinges 26. A pair of opposing sockets 28 extend inwardly from the interior surface of the vessel at the level of this annular channel 16 and locating segments 30, which are fixedly mounted to the end of the central rectangular panel 24, are positioned within these sockets 28 to define an axis about which the central panel may rotate. An actuator or handle 32 is pivotally connected to the central rectangular panel for limited rotation about an axis parallel to the axis of the panel.

To place the lid 20 upon the shoulder 18, the actuator 32 is rotated to stand vertically (FIG. 3). The natural bias of the elongated toggle hinges rotates the central panel until the planar edges 33 of the locating segments 30 become aligned wth the parallel sides of the removal slots 34 which extend from the top of the vessel to the sockets 28. The lid can than be lowered until the locating segments 30 enter the vessel sockets 28. As the lid is lowered the lid flattens out and the ends of the simicircular end portions pass beneath the ends of opposing sets of teeth 36 which project outwardly from the interior surface of the vessel. After the lid is placed upon the shoulder 18 the actuator 32 is rotated clockwise until it abuts a first stop 38 which projects upwardly from the top surface of the central rectangular panel 24 (FIG. 2). Further rotation thereof results in the central rectangular panel being rotated in the clockwise direction. The elongated toggle hinges 26 are thereby rotated and displaced effecting a lateral displacement of the semicircular end portions toward the interior surface of the vessel 10. The tracks formed by the sets of teeth 36 and the vessel shoulder 18 assure that the plane in which the semicircular end portions lie when they have been laterally displaced into engagement with the walls 40 of the annular channel 16 (FIG. 2) will be the same plane in which the semicircular end portions lie when the container is opened (FIG. 5).

The height and location of the stop 38 is selectively chosen so that when the actuator 32 is rotated clockwise into engagement with the right hand semicircular end portion 22, the central panel 24 and hence the elongated toggle hinges 26 will be respectively rotated and rotated and displaced by the actuator into the plane of the semicircular end portions thereby effecting a maximum lateral displacement of the semicircular end portions toward and into engagement with the walls of the annular channel. The annular channel 16 has inclined walls 40 and when the semicircular end portions are urged into engagement with these inclined walls 40 an excellent seal is established therebetween.

The actuator has an aperture 42 through which a catch 44, which is integral with the right hand semicircular end portion, may pass to maintain the actuator in engagement with the right hand semicircular edge portion to keep the vessel closed. Since the central panel 24 and toggle hinges 26 should be free to rotate, the shoulder 18 is eliminated along the periphery of the annular channel from the central panel sockets 28 to the points 46 of furthest extension of the hinged edge of the left and right hand semicircular end portions 22.

When the semicircular end portions are urged apart forming a substantially eliptical lid the opening of the plastic, metallic or the like cylindrical vessel is distorted causing the vessel portions adjacent to the central rectangular panel and toggle hinges to be pulled together. The ends of the central rectangular panel and toggle hinges are thereby urged into engagement with the inclined surfaces 40 of the annular channel 16, completing the seal between the lid and the annular channel around the entire periphery of the lid.

The positioning of the outer periphery of the lid firmly within the annular channel maintains the lid in its proper position and prevents the lid from being dislocated from its position extending across the vessel opening should the container be inverted.

An effective seal is also achieved at the sockets 28 since the sockets are in the form of mirrored keystones as shown in FIG. 4, with the planar walls thereof engaging the planar edges of the locating segments 30 when the container is closed.

The central rectangular panel 24 additionally has a second stop 48 in the form of a wedge which projects upwardly from the top surface of the panel on the side of the actuator opposite from the first stop 38. As can be seen from FIG. 5 this stop is selectively sized and shaped to prevent the counterclockwise rotation of the actuator 32 relative to the central panel 24 beyond an inclination therewith of approximately 60°. When the actuator 32 is rotated counterclockwise into engagement with the left hand semicircular end portion 22, the central rectangular panel 24 is rotated about its axis, and the toggle hinges 26 are accordingly rotated and displaced effecting a displacement of the semicircular end portions toward the center of the vessel and out of engagement with the inclined surfaces 40 of the annular channel. The vessel is accordingly opened and its contents can be poured therefrom. Since both semicircular end portions are disengaged from the vessel forming two oppositely located restricted openings the contents can be smoothly removed from the vessel. A second catch 50 which is integral with the left hand semicircular end portion is located to pass through the actuator aperture 42 to maintain the lid in this opened position. It is presently preferred that the central rectangular panel be inclined to the horizontal by approximately 60° when the lid is in the opened position.

The central panel may be made substantially thicker than the semicircular end and toggle hinge portions in order to assure that the bending moment will be evenly distributed along its length.

The entire lid in the preferred embodiment is an integral one piece member made from polyethelyene or any other suitable plastic or nylon and the toggle joints are established by molding the lid member with lines of narrowed width, pinching these lines and bending the adjacent portions of the lid about these pinched lines of weakness while hot.

Figure 6:
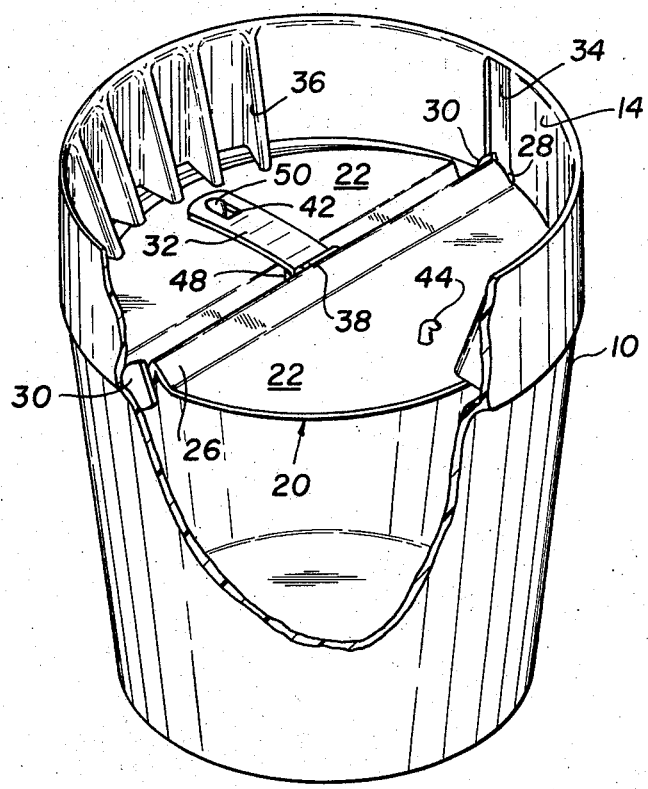
FIG. 6 is a view similar to that of FIG. 1 of a portion of the container with the closure lid in open position.

At least one and in the preferred embodiment five retaining projections or teeth 36 extend outwardly from the interior surface of the vessel over the semicircular end portions when the container is opened (FIGS. 5 and 6). These retaining projections and the socket and locating segment connections of the central rectangular panel to the vessel opening when the contents of the container is being poured out.

Having thus described my invention, I claim:

1. A container comprising
  vessel means including an opening,
  supporting shelf means perimetrically disposed on the interior surface of said vessel means in predetermined spaced relation with the opening therein,
  lid means perimetrically supported by said shelf means and peripherally engageable with the interior surface of said vessel means adjacent to said shelf means for closing said container,
  said lid means including a rotatably displaceable central portion and a pair of substantially lineally displaceable end portions,
  and manually manipulable means for rotatably displacing said central portion of said lid means in one direction to selectively advance the perimetric edges of said end portions into peripheral compressive engagement with the interior surface of said vessel means to close said container and in a second direction to selectively retract said end portions to displace said perimetric edges thereof into spaced relation with the interior surface of said vessel to open said container.

2. A container according to claim 1 including means for maintaining the periphery of said end portions of said lid means in substantially coplanar relation with said shelf means.

3. A container according to claim 1, wherein said lid means further includes:
  a pair of elongated toggle hinge means for joining said end portions to said central portion,
  means for pivotally connecting said central portion to said vessel means, and
  means for positioning said end portions, central portion and toggle hinges in a single plane to effect said maximum separation.

4. A container according to claim 3, wherein said lid means is a one piece, integral member.

5. A container according to claim 3, wherein said end portions are simicircular in shape.

6. A container according to claim 1, wherein the end portions of said lid means are semi-circular in scope and wherein said central portion further includes,
  manually engageable actuator means secured thereto for rotative displacement about the axis of said central portion,
  means for limiting rotation of said actuator means in one direction when said actuator means lies in a plane approximately parallel to said central portion, and
  second means for limiting rotation of said actuator means in a second direction when said actuator means is disposed at a predetermined angle with respect to said central portion,
  said actuator means being rotatively displaceable from said first limiting position wherein said actuator and central portion are substantially parallel and wherein the perimetric edges of said end portions will be disposed in compressively engaged relation with the interior surface of said vessel to a second limiting position wherein said actuator is disposed at said predetermined angle with respect to said central portion and wherein the perimetric edges of said end portions will be disposed in spaced relation with the interior surface of said vessel means.

7. A container according to claim 6, wherein said container comprises means for allowing the removal of said lid means from said vessel means when said actuator means is in a position intermediate said first and second positions.

8. A container according to claim 6, wherein said vessel means further includes projection means extending inwardly from the interior surface of said vessel over said semicircular end portions of the lid means proximate the midpoint of their outer periphery when said container is opened for retaining said semicircular end portions on said supporting means.

9. A container according to claim 6, wherein said lid means further comprises:
   means for maintaining said actuator means in said first position, and
   means for maintaining said actuator means in said second position.

10. A container according to claim 6, wherein said angle is approximately 60°.

* * * * *